United States Patent [19]

Sakae et al.

[11] Patent Number: 5,393,861
[45] Date of Patent: Feb. 28, 1995

[54] POLYSULFIDE POLYETHER AND POLYMER COMPOSITION COMPRISING POLYSULFIDE AND POLYETHER

[75] Inventors: Kazuhisa Sakae; Kouki Echigoya; Mitsuhiro Okajima, all of Chiba, Japan

[73] Assignee: Toray Thiokol Co., Ltd., Chiba, Japan

[21] Appl. No.: 225,918

[22] Filed: Apr. 11, 1994

Related U.S. Application Data

[63] Continuation of Ser. No. 599,590, Oct. 18, 1990, abandoned.

[30] Foreign Application Priority Data

Oct. 18, 1989 [JP] Japan .................................. 1-271265
Apr. 25, 1990 [JP] Japan .................................. 2-109461

[51] Int. Cl.⁶ .......................... C08K 5/15; C08K 5/20
[52] U.S. Cl. .................................... 528/265; 528/374; 528/375; 528/388; 525/523; 525/537
[58] Field of Search ............... 528/265, 374, 375, 388; 525/523, 537

[56] References Cited

U.S. PATENT DOCUMENTS

| | | | |
|---|---|---|---|
| 2,466,963 | 4/1949 | Patrick et al. | 260/79.1 |
| 3,258,495 | 6/1966 | LeFave et al. | 528/374 |
| 3,431,239 | 3/1969 | Morris et al. | 260/48 |
| 3,455,328 | 7/1969 | Kane | 260/79 |
| 3,770,678 | 11/1973 | Paul | 260/28 |
| 3,817,947 | 6/1974 | Bertozzi | 260/28 |
| 3,872,059 | 3/1975 | Ely | 528/374 |
| 3,923,748 | 12/1975 | Hutt et al. | 260/77.5 |
| 3,925,331 | 12/1975 | Ely | 528/374 |
| 4,092,293 | 5/1978 | Harris et al. | 260/47 |
| 4,110,295 | 8/1978 | Wilhelm et al. | 260/30.4 R |
| 4,623,711 | 11/1986 | Morris et al. | 528/375 |

FOREIGN PATENT DOCUMENTS

| | | |
|---|---|---|
| 0171198 | 2/1986 | European Pat. Off. . |
| 1902450 | 7/1969 | Germany . |
| 46-3389 | 1/1971 | Japan . |
| 47-48279 | 12/1972 | Japan . |
| 56-15751 | 4/1981 | Japan . |
| 1351736 | 5/1974 | United Kingdom . |

OTHER PUBLICATIONS

World of Patents Index Latest, Week 8319, Derwent Publications Ltd., London GB; AN 83-45877K & JP-A-58 057 457.

*Primary Examiner*—Melvyn I. Marquis
*Assistant Examiner*—Helen F. Lee
*Attorney, Agent, or Firm*—Armstrong, Westerman, Hattori, McLeland & Naughton

[57] ABSTRACT

The polysulfide polyether of the present invention has in a main chain (i) a polyether moiety represented by $-(R_1O)-_n$; (ii) structural units represented by
$-(C_2H_4O\ CH_2O\ C_2H_4-S_x)-$, and
$-(CH_2CH(OH)\ CH_2-S_x-)$;
and at both ends (iii) a thiol group represented by
$-C_2H_4O\ CH_2O\ C_2H_4-SH$, and/or
$-CH_2CH(OH)\ CH_2-SH$.

When mixed with epoxy resins, etc., this polymer is cured at a controlled speed.

4 Claims, No Drawings

POLYSULFIDE POLYETHER AND POLYMER COMPOSITION COMPRISING POLYSULFIDE AND POLYETHER

This application is a continuation of application Ser. No. 07/599,590, filed Oct. 18, 1990, now abandoned.

BACKGROUND OF THE INVENTION

The present invention relates to a polysulfide polyether and a method of producing a polysulfide polyether and particularly to a polysulfide polyether having compatibility with plasticizers and containing only small amounts of low-molecular weight components and a method of producing such a polysulfide polyether. It further relates to a curable composition suitable for sealing materials needing only small amounts of plasticizers, which suffers from little transfer of plasticizers into a paint coating applied onto a cured product thereof, thereby avoiding the softening of the paint coating. Further, it relates to a polymer composition serving as curing agents for epoxy resins having a high curing speed and capable of providing a highly durable cured product.

When polymers containing two or more thiol groups in one molecule are mixed with an oxidizing agent, they are easily cured, and their thiol groups are easily reacted with epoxy groups, isocyanate groups, etc. to become high-molecular compounds. Accordingly, such polymers are widely used for sealing materials, paints, adhesives, etc.

Such a thiol group-containing polymer is described, for instance, in U.S. Pat. No. 2,466,963. Since the polysulfide polymer described in U.S. Pat. No. 2,466,963 has excellent oil resistance, chemical resistance, flexibility, etc., it is used as starting materials for sealants. When used with epoxy resins having two or more epoxy groups in one molecule, the polysulfide polymer can provide the epoxy resins with flexibility.

Since this polysulfide polymer has a structure of polysulfide bonds $S_x$ ($x=1-5$) in a molecule, it shows high polarity, and only limited types of plasticizers can be used. Since widely used, inexpensive plasticizers cannot be used, compounds such as sealants containing the polysulfide polymer are relatively expensive. In addition, since it shows a higher viscosity than expected from its molecular weight, a larger amount of a plasticizer is required to be added to improve the handling of the compound at a curing temperature. Accordingly, when a cured product of a sealant produced from the polysulfide polymer is covered by a paint coating, plasticizers tend to ooze out, thereby softening the paint coating.

Japanese Patent Publication No. 56-15751 discloses a curable composition comprising a polysulfide polymer and a polyester of mercaptocarboxylic acid and poly(oxyalkylene) polyol. Since the polyester in this composition does not contain disulfide bonds, it does not have good compatibility with the polysulfide polymer. Accordingly, only the conventional plasticizers compatible with polysulfide polymers can be used.

Apart from the above, the polysulfide polymer shows good adhesion strength and water-resistant adhesion, but is slow in curing at a low temperature when used together with epoxy resins.

As a thiol group-containing polyether having an improved low-temperature curing speed, Japanese Patent Publication No. 47-48279 discloses a liquid polymer represented by the general formula:

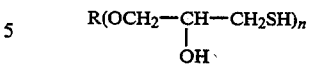

wherein R is an alkylene group having 2–4 carbon atoms, and n is an integer of 2–6, and having a viscosity of 100–120,000 centipoise and a chemical equivalent of 150 determined by the thiol content. However, this polymer is poor in water-resistant adhesion, though it shows a good low-temperature curing speed.

In addition, when a polysulfide polymer and its composition with a thiol group-containing polyether are cured by an oxidizing agent, they become rigid, losing elasticity and durability when exposed to a high temperature of 80° C. or higher.

As an oxidizing agent for polymers containing one or more thiol groups in one molecule, inorganic oxides, inorganic peroxides, organic peroxides, etc. are known, and metal peroxides such as $PbO_2$, $MnO_2$, $ZnO_2$, $CaO_2$, etc. are widely used.

A mixture of a polysulfide polymer and a thiol group-containing polyether is also easily cured when mixed with an oxidizing agent for the thiol group-containing polymers.

With respect to a mixture of a polysulfide polymer and a thiol group-containing polyether, sulfur is often added to improve its properties, but the addition of sulfur makes a curing speed of the mixture extremely slow.

OBJECT AND SUMMARY OF THE INVENTION

Accordingly, a first object of the present invention is to provide a polysulfide polyether having good compatibility with plasticizers and containing smaller amounts of low-molecular weight components, and a method of producing such a polysulfide polyether.

A second object of the present invention is to provide a curable composition containing a polysulfide polyether, a cured product of which does not soften a paint coating formed thereon because of a reduced amount of a plasticizer to be used.

A third object of the present invention is to provide a polymer composition showing good adhesion and water resistance and high curing speed when mixed with an epoxy resin.

A fourth object of the present invention is to provide a curable composition based on a polysulfide polymer and a thiol group-containing polyether and/or a polysulfide polyether and showing a curing speed suitable at a operating temperature when cured by an oxidizing agent.

A fifth object of the present invention is to provide a curable composition capable of providing a cured product showing smaller increase of modulus when exposed to a high temperature and good durability.

As a result of intense research in view of the above objects, the inventors have found that:

(1) Since a polysulfide polyether having a polyether moiety in a main chain has a small polarity and is compatible with plasticizers which cannot be dissolved in the conventional polysulfide polymers, it shows such a low viscosity that the amount of plasticizers used can be reduced. In addition, when a paint is applied to a cured product of such polysulfide polyether, the reduced amount of plasticizers is transferred into a paint coating, thereby preventing the contamination of the paint coating.

(2) Since this polysulfide polyether contains reduced amounts of low-molecular weight components having molecular weights of 500 or less, a cured product thereof shows good elongation.

(3) When used with epoxy resins, this polysulfide polyether is quickly cured at a low temperature, and a cured product thereof shows a sufficient adhesion strength and water resistance.

(4) By adding an oxidizing agent, sulfur and particular additives to a mixture of a polysulfide polymer and a thiol group-containing polyether having disulfide bonds in a main chain, and/or the above polysulfide polyether, the curing speed can be controlled stably to make it suitable at an operating temperature.

(5) By adding to a mixture of a polysulfide polymer and a thiol group-containing polyether, and/or the above polysulfide polyether, an oxidizing agent and a particular amount of at least one of (i) a compound having a carbon-carbon double bond, (ii) a nitrogen-containing heterocyclic compound and/or an aromatic amine, (iii) a phosphonate, (iv) a thioether antioxidant, and (v) an epoxy plasticizer, the resulting cured product shows smaller increase in modulus when exposed to a high temperature, and a drastically improved durability.

The present invention has been completed based upon these findings.

Thus, the polysulfide polyether according to the present invention has in a main chain:
(i) a polyether moiety represented by $-(R_1O)-_n$, wherein $R_1$ is an alkylene group having 2-4 carbon atoms, and n is an integer of 6-200;
(ii) structural units represented by
$-(C_2H_4O\ CH_2O\ C_2H_4-S_x)-$, and
$-(CH_2CH\ (OH)\ CH_2-S_x)-$
wherein x is an integer of 1-5;
and at both ends
(iii) a thiol group represented by
$-C_2H_4O\ CH_2O\ C_2H_4-SH$, and/or
$-CH_2CH\ (OH)\ CH_2-SH$.

The first method of producing this polysulfide polyether according to the present invention comprises causing a reaction of:
(a) a polysulfide polymer represented by:
$HS-(C_2H_4O\ CH_2O\ C_2H_4-S_x)_m\ C_2H_4O\ CH_2O\ C_2H_4-SH$,
wherein x is an integer of 1-5, and m is an integer of 1-50; with
(b) a polyether having in a main chain: a polyether moiety represented by $-(R_1O)-_n$, wherein $R_1$ is an alkylene group having 2-4 carbon atoms, and n is an integer of 6-200, and a structural unit represented by
$-(CH_2CH\ (OH)\ CH_2-S_x)-$, wherein x is an integer of 1-5, and at both ends a thiol group represented by:
$-CH_2CH\ (OH)\ CH_2-SH$,
at a weight ratio (a)/(b)=95/5-5/95.

The second method of producing this polysulfide polyether according to the present invention comprises causing a reaction of:
(a) a polysulfide polymer represented by:
$HS-(C_2H_4O\ CH_2O\ C_2H_4-S_x)_m\ C_2H_4O\ C_2H_4-SH$,
wherein x is an integer of 1-5, and m is an integer of 1-50; with (b) a halogen-terminated prepolymer obtained by the reaction of a polyol having in a main chain a polyether moiety represented by $-(R_1O)-_n$, wherein $R_1$ is an alkylene group having 2-4 carbon atoms and n is an integer of 6-200, and two or more hydroxyl groups, with epihalohydrin; and
(c) MSH and/or $M_2S_x$, wherein M is an alkali metal and x is an integer of 1-5;
in such proportions that a weight ratio (a)/(b)=95/5-5/95, and that (c) is 1-50 parts by weight per 100 parts by weight of (a)+(b).

The first curable composition according to the present invention comprises:
(A) a polysulfide polyether having in a main chain:
(i) a polyether moiety represented by $-(R_1O)-_n$, wherein $R_1$ is an alkylene group having 2-4 carbon atoms, and n is an integer of 6-200;
(ii) structural units represented by
$-(C_2H_4O\ CH_2O\ C_2H_4-S_x)-$, and
$-(CH_2CH\ (OH)\ CH_2-S_x)-$ wherein x is an integer of 1-5;
and at both ends
(iii) a thiol group represented by
$-C_2H_4O\ CH_2O\ C_2H_4-SH$, and/or
$-CH_2CH\ (OH)\ CH_2-SH$; and
(B) an oxidizing agent.

The second curable composition according to the present invention comprises:
(A) a polysulfide polyether having in a main chain:
(i) a polyether moiety represented by $-(R_1O)-_n$, wherein $R_1$ is an alkylene group having 2-4 carbon atoms, and n is an integer of 6-200;
(ii) structural units represented by
$-(C_2H_4O\ CH_2O\ C_2H_4-S_x)-$, and
$-(CH_2CH\ (OH)\ CH_2-S_x)-$,
wherein x is an integer of 1-5;
and at both ends
(iii) a thiol group represented by
$-C_2H_4O\ CH_2O\ C_2H_4-SH$, and/or
$-CH_2CH\ (OH)\ CH_2-SH$;
(B) an epoxy resin having two or more epoxy groups in one molecule; and
(C) an amine.

The polymer composition according to the present invention comprises:
(a) a polysulfide polymer; and
(b) a thiol group-containing polyether having a polyether moiety represented by $-(R_1O)-_n$, wherein $R_1$ is an alkylene group having 2-4 carbon atoms, and n is an integer of 6-200, and a polysulfide bond $S_x$ in a main chain, and a thiol group at ends, a weight ratio of said polysulfide bond to a mercaptan group being 1.06 or more, at a weight ratio (a)/(b)=95/5-5/95.

The third curable composition according to the present invention comprises:
(A) a mixture of:
(a) a polysulfide polymer; and
(b) a thiol group-containing polyether having a polyether moiety represented by $-(R_1O)-_n$, wherein $R_1$ is an alkylene group having 2-4 carbon atoms and n is an integer of 6-200 and a polysulfide bond $S_x$ in a backbone chain, and a thiol group at ends, a weight ratio of the polysulfide bond to a mercaptan group being 1.06 or more, at a weight ratio (a)/(b)=95/5-5/95; and
(B) an oxidizing agent.

The fourth curable composition according to the present invention comprises:

(A) a mixture of:
 (a) a polysulfide polymer; and
 (b) a thiol group-containing polyether having a polyether moiety represented by —($R_1$O)—$_n$, wherein $R_1$ is an alkylene group having 2-4 carbon atoms and n is an integer of 6-200 and a polysulfide bond $S_x$ in a backbone chain, and a thiol group at ends, a weight ratio of the polysulfide bond to a mercaptan group being 1.06 or more, at a weight ratio (a)/(b)=95/5-5/95;

(B) an epoxy resin having two or more epoxy groups in one molecule; and (C) an amine.

The fifth curable composition according to the present invention comprises:

(A) 100 parts by weight of
 (I) a mixture of:
  (a) a polysulfide polymer, and
  (b) a thiol group-containing polyether having a polyether moiety represented by —($R_1$O)—$_n$, wherein $R_1$ is an alkylene group having 2-4 carbon atoms, and n is an integer of 6-200, and a polysulfide bond $S_x$ in a main chain, and a thiol group at ends, a weight ratio of said polysulfide bond to a mercaptan group being 1.06 or more, at a weight ratio (a)/(b)=95/5-5/95, and/or
 (II) a polysulfide polyether having in a main chain:
  (i) a polyether moiety represented by —($R_1$O)—$_n$;
  (ii) structural units represented by
   —($C_2H_4$O $CH_2$O $C_2H_4$—$S_x$)—, and
   —($CH_2$CH (OH) $CH_2$—$S_x$)—,
   wherein x is an integer of 1-5;
  and at both ends
  (iii) a thiol group represented by
   —$C_2H_4$O $CH_2$O $C_2H_4$—SH, and/or
   —$CH_2$CH (OH) $CH_2$—SH;

(B) 1-50 parts by weight of an oxidizing agent;
(C) 0.1-2 parts by weight of sulfur; and
(D) 0.01-10 parts by weight of a vulcanization accelerator and/or an amine.

The sixth curable composition according to the present invention comprises:

(A) 100 parts by weight of
 (I) a mixture of:
  (a) a polysulfide polymer, and
  (b) a thiol group-containing polyether having a polyether moiety represented by —($R_1$O)—$_n$, wherein $R_1$ is an alkylene group having 2-4 carbon atoms and n is an integer of 6-200 and a polysulfide bond $S_x$ in a main chain, and a thiol group at ends, a weight ratio of polysulfide bonds to mercaptan groups being 1.06 or more, at a weight ratio (a)/(b)=95/5-5/95, and/or
 (II) a polysulfide polyether having in a main chain:
  (i) a polyether moiety represented by —($R_1$O)—$_n$;
  (ii) structural units represented by
   —($C_2H_4$O $CH_2$O $C_2H_4$—$S_x$)—, and
   —($CH_2$CH (OH) $CH_2$—$S_x$)—,
   wherein x is an integer of 1-5;
  and at both ends
  (iii) a thiol group represented by
   —$C_2H_4$O $CH_2$O $C_2H_4$—SH, and/or
   —$CH_2$CH (OH) $CH_2$—SH;

(B) 1-50 parts by weight of an oxidizing agent; and
(C) 0.5-50 parts by weight of at least one compound selected from the following compounds (i)-(v):
 (i) a compound having a carbon-carbon double bond,
 (ii) a nitrogen-containing heterocyclic compound and/or an aromatic amine,
 (iii) a phosphonate,
 (iv) a thioether antioxidant, and
 (v) an epoxy plasticizer.

DETAILED DESCRIPTION OF THE INVENTION

The polysulfide polyether of the present invention has in a main chain:

(i) a polyether moiety represented by —($R_1$O)—$_n$, wherein $R_1$ is an alkylene group having 2-4 carbon atoms, and n is an integer of 6-200;

(ii) structural units represented by
 —($C_2H_4$O $CH_2$O $C_2H_4$—$S_x$)—, and
 —($CH_2$CH (OH) $CH_2$—$S_x$)—,
 wherein x is an integer of 1-5;

and at both ends
(iii) a thiol group represented by
 —$C_2H_4$O $CH_2$O $C_2H_4$—SH, and/or
 —$CH_2$CH (OH) $CH_2$—SH.

In this polysulfide polyether, the polyether moiety (i) and the structural units (ii) may be combined in any order. With respect to their proportions, an —($R_1$O)—$_n$ component is 2-95 weight %, a —($C_2H_4$O$CH_2$O$C_2H_4$—$S_x$)— component is 3-70 weight %, a —($CH_2$CH(OH)$CH_2$—$S_x$)— component is 1-50 weight %, and a polysulfide bond $S_x$ is 1-60 weight %.

When the —($R_1$O)—$_n$ component is less than 2 weight %, a sufficient effect of improving compatibility with plasticizers cannot be obtained. On the other hand, when it exceeds 95 weight %, the resulting cured product shows poor weathering resistance.

When the —($C_2H_4$O$CH_2$O$C_2H_4$—$S_x$)— component is less than 3 weight %, the resulting cured product shows poor weathering resistance. On the other hand, when it exceeds 70 weight %, a sufficient effect of improving compatibility with plasticizers cannot be obtained.

When the —($CH_2$CH(OH)$CH_2$—$S_x$)— component is less than 1 weight %, the resulting cured product shows poor weathering resistance. On the other hand, when it exceeds 50 weight %, a sufficient effect of improving compatibility with plasticizers cannot be obtained.

When the content of the polysulfide bonds $S_x$ is less than 1 weight %, the resulting cured product shows poor weathering resistance. On the other hand, when it exceeds 60 weight %, a sufficient effect of improving compatibility with plasticizers cannot be obtained.

The polysulfide polyether has a number-average molecular weight ($\overline{M}n$) of generally 600-200,000, and preferably 800-50,000.

The first method of producing this polysulfide polyether comprises causing a reaction of:

(a) a polysulfide polymer starting material represented by:
 HS($C_2H_4$O $CH_2$O $C_2H_4S_x$)$_m C_2H_4$O $CH_2$O $C_2H_4$SH; with (b) a polyether having in a main chain a polyether moiety represented by —($R_1$O)—$_n$ and a structural unit represented by —($CH_2$CH (OH) $CH_2$—$S_x$)—, and at both ends a thiol group represented by:
—$CH_2CH(OH)CH_2$—SH,
at a weight ratio (a)/(b)=95/5-5/95.

In the above general formula:

$$HS-(C_2H_4O\ CH_2O\ C_2H_4-S_x)_mC_2H_4O\ CH_2O\ C_2H_4-SH, \qquad (1)$$

of the polysulfide polymer starting material, x is an integer of 1–5, and m is an integer of 1–50.

The above polysulfide polymer starting material shows fluidity at room temperature and has a molecular weight, of 100–200,000, preferably 400–50,000.

Such polysulfide polymer starting materials are described in U.S. Pat. 2,466,963.

The above thiol group-containing polyether contains a polyether moiety represented by —$(R_1O)$—$_n$ in a main chain, wherein $R_1$ is an alkylene group having 2–4 carbon atoms, and n is an integer of 6–200. This polyether moiety preferably has a molecular weight of 400–10,000. When its molecular weight is less than 400, it does not have a sufficient effect of improving compatibility with plasticizers when reacted with the polysulfide polymer. On the other hand, when the molecular weight exceeds 10,000, the thiol group-containing polyether shows an undesirably high viscosity.

This thiol group-containing polyether also has the structural unit represented by:
—$(CH_2CH(OH)CH_2-S_x)$—,
wherein x is an integer of 1–5, and preferably 2, and at ends a thiol group represented by:
—$CH_2CH(OH)CH_2$—SH.

$S_x$ in the thiol group-containing polyether is preferably disulfide, and a weight ratio of a polysulfide bond to a mercaptan group is preferably 1.06 or more. When a weight ratio of a polysulfide bond to a mercaptan group is less than 1.06, the percentage of the polysulfide bond $S_x$ is insufficient, whereby compatibility of the thiol group-containing polyether with the polysulfide polymer starting material is undesirably low.

Such thiol group-containing polyether can be synthesized by known methods described in Japanese Patent Publication No. 47-48279. Specifically, by reacting polyalkylene glycol such as polypropylene glycol, polyethyelene glycol, etc. with epihalohydrin such as epichlorohydrin, epibromohydrin, etc. and then causing its reaction with an alkali hydrosulfide such as sodium hydrosulfide, potassium hydrosulfide, etc. represented by MSH, wherein M is an alkali metal such as Na, K, and/or an alkali polysulfide such as sodium polysulfide, potassium polysulfide represented by $M_2S_x$, wherein M is an alkali metal and x is an integer of 1–5, a polyether having a functional group represented, for instance, by the following general formula (2):

95/5-5/95, preferably 90/10-10/90. When the polysulfide polymer starting material is less than 5 weight %, the resulting cured product shows poor weathering resistance. On the other hand, when the content of the thiol group-containing polyether is less than 5 weight %, a sufficient effect of improving compatibility with plasticizers cannot be obtained.

The reaction conditions of the polysulfide polymer starting material and the thiol group-containing polyether are +°–150° C., preferably 50°–120° C. for 2–48 hours, preferably 4–10 hours while stirring.

The reaction of the polysulfide polymer starting material and the thiol group-containing polyether is a reaction of exchanging polysulfide bonds and thiol groups exemplified by the equation (3-1), or an exchange reaction of polysulfide bonds $S_x$ exemplified by the equation (3-2):

$$\sim\sim C_2H_4OCH_2OC_2H_4-S_x-C_2H_4OCH_2OC_2H_4\sim\sim+ \qquad (3\text{-}1)$$
$$HS-CH_2CH(OH)CH_2-O-(R_1O)_n\sim\sim \longrightarrow$$
$$\sim\sim C_2H_4OCH_2OC_2H_4-S_x-CH_2CH(OH)CH_2-O-(R_1O)_n-\sim\sim+$$
$$HS-C_2H_4OCH_2OC_2H_4\sim\sim$$

$$\sim\sim C_2H_4OCH_2OC_2H_4-S_x-C_2H_4OCH_2OC_2H_4\sim\sim+ \qquad (3\text{-}2)$$
$$\sim\sim O-CH_2CH(OH)CH_2-S_x-CH_2CH(OH)CH_2-O\sim\sim \longrightarrow$$
$$\sim\sim C_2H_4OCH_2OC_2H_4-S_x-CH_2CH(OH)CH_2-O-\sim\sim+$$
$$\sim\sim O-CH_2CH(OH)CH_2-S_x-C_2H_4OCH_2OC_2H_4\sim\sim$$

By these reactions, the polyether moiety is introduced into the main chain of the polysulfide polymer starting material.

The above by-product is a low-molecular weight component having the same structure as the polysulfide polymer starting material represented, for instance, by the following general formula (4):

$$HS-(C_2H_4OCH_2OC_2H_4-S_x)_q-C_2H_4OCH_2OC_2H_4-SH \qquad (4)$$

wherein q is an integer of 0–2.

Here, when this by-product is heated at 30°–150° C., preferably 50°–120° C., it participates in the above reactions, thereby preventing the broadening of a molecular weight distribution of the polysulfide polymer starting material and reducing the amount of the low-molecular weight component (number-average molecular weight: 500 or less) to 10 weight % or less.

$$HS-CH_2-\underset{OH}{CH}-CH_2(\!\!\!-O-\underset{CH_3}{CH}-CH_2\!\!\!)_nO-CH_2-\underset{OH}{CH}-CH_2-[S_x-CH_2-\underset{OH}{CH}-CH_2(\!\!\!-O-\underset{CH_3}{CH}-CH_2\!\!\!)_nO-CH_2-\underset{OH}{CH}-CH_2]_mSH \qquad (2)$$

wherein n is an integer of 6–200, m is 1 or 2, and x is an integer of 1–5.

The polymer thus obtained partially contains in a main chain polysulfide bonds $S_x$, wherein the polymerization number of $S_x$ is 1–5.

In the first method of producing the polysulfide polyether according to the present invention, a mixing ratio of the polysulfide polymer starting material to the thiol group-containing polyether is, by weight ratio, Alternatively, the polysulfide polyether of the present invention can be produced by a single-step reaction by adding a polysulfide polymer starting material in advance in the synthesis of the thiol group-containing polyether in the above method.

In this second method, a polyalkylene glycol having a main chain represented by —$(R_1O)$—$_n$ wherein $R_1$ is an alkylene group having 2–4 carbon atoms, and n is an integer of 6–200, and two or more hydroxyl groups at ends, such as polypropylene glycol, polyethylene glycol, etc. is reacted with epihalohydrin such as epichlorohydrin, epibromohydrin, etc. to produce a halogen-terminated prepolymer, and end groups of this halogen-terminated prepolymer are substituted by thiol groups by reaction with alkali hydrosulfides and/or alkali polysulfides. In this reaction, polysulfide polymer represented by the general formula (1):

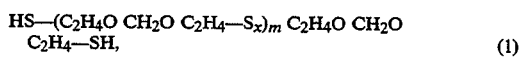
(1)

wherein x is an integer of 1–5, and m is an integer of 1–50, is added and allowed to react with the above compounds simultaneously.

In this second method, a weight ratio of the halogen-terminated prepolymer to the polysulfide polymer is 95/5-5/95, preferably 90/10-10/90. When the content of the polysulfide polymer is less than 5 weight %, the resulting cured product shows poor weathering resistance. On the other hand, when the content of the halogen-terminated prepolymer is less than 5 weight %, a sufficient effect of improving compatibility with plasticizers cannot be obtained.

As the alkali hydrosulfides, a technical grade of flake sodium hydrosulfide is preferable. This sodium hydrosulfide has a purity of about 70%, and contains a trace amount of sodium polysulfide component.

The amount of MSH and/or $M_2S_x$ is generally 1–50 parts by weight, preferably 2–35 parts by weight, per 100 parts by weight of (a)+(b). When the amount of MSH and/or $M_2S_x$ is lower than 1 parts by weight, the halogen groups of the halogen-terminated prepolymer cannot sufficiently be substituted by thiol groups. On the other hand, when it exceeds 50 parts by weight, the polymer shows an extremely increased viscosity in its synthesis.

In the second method, by substituting halogen-end groups of the halogen-terminated prepolymer with thiol group in the presence of the polysulfide polymer under the same temperature conditions as in the first method, the above reactions (3-1) and (3-2) take place as in the first method, while preventing the accumulation of low-molecular weight components as shown by the formula (4).

The first curable composition of the present invention is obtained by mixing the polysulfide polyether thus obtained with an oxidizing agent.

Usable as the oxidizing agent in the present invention are materials conventionally used as curing agents for thiol group-containing polymers. Specific examples of these oxidizing agents include inorganic peroxides such as $ZnO_2$, $FeO_2$, $PbO_2$, $MgO_2$, $CaO_2$, $BaO_2$, $MnO_2$, $TeO_2$, $SeO_2$, $Pb_3O_4$, $SrO_2$, $LiO_2$, etc.; inorganic oxides such as ZnO, FeO, PbO, $Fe_2O_3$, $Sb_2O_3$, MgO, CoO, CaO, CuO, BaO, etc.; inorganic oxidizing agent such as $Na_2CrO_4$, $K_2CrO_4$, $Na_2Cr_2O_7$, $K_2Cr_2O_7$, $NaClO_4$, $NaBO_2 \cdot H_2O_2$, $K_2C_2O_6$, $KMnO_4$, sodium percarbonate ($2NaCO_3 + 3H_2O_2$), etc.; organic peroxides such as benzoyl peroxide, dicumyl peroxide, cumene hydroperoxide, t-butyl hydroperoxide, t-butyl perbenzoate, sodium peracetate, urea peroxide, etc.; organic oxidizing agents such as nitrobenzene, dinitrobenzene, paraquinon dioxime, etc. Among them, $PbO_2$ is most useful.

In the first curable composition of the present invention, the amount of the oxidizing agent may vary depending upon the type of the oxidizing agent used, but it is generally 1–50 parts by weight per 100 parts by weight of the polysulfide polyether.

The second curable composition of the present invention is obtained by mixing (A) the above polysulfide polyether with (B) an epoxy resin having two or more epoxy groups in one molecule and (C) an amine. This second curable composition shows a higher curing speed at a low temperature as compared to the conventional polysulfide polymers, and has improved flexibility and water-resistant adhesion than the thiol group-containing polyethers themselves.

The epoxy resins used in the present invention include epoxy resins obtained by adding epihalohydrin to polyhydric phenols such as bisphenol A, halogenated bisphenol A, bisphenol F, halogenated bisphenol F, resorcinol, hydroquinone, pyrocatechol, 4,4'-dihydroxybiphenyl, 1,5-hydroxynaphthalene, etc.; epoxy resins obtained by adding epihalohydrin to polyhydric alcohols such as ethylene glycol, propylene glycol, glycerin, etc.; epoxy resins obtained by adding epihalohydrin to hydroxybenzoic acid and/or aromatic dicarboxylic acids such as phthalic acid, etc.

The amines used in the present invention are preferably those used as curing accelerators when thiol group-containing polymers are used as curing agents for epoxy resins. Specific examples thereof include aliphatic tertiary amines such as N,N-dimethylpropylamine, N,N,N',N'-tetramethylhexamethylenediamine, etc.; alicyclic tertiary amines such as N-methylpiperidine, N,N'-dimethylpiperazine, etc.; aromatic tertiary amines such as benzyldimethylamine, dimethylaminomethylphenol, 2,4,6-tris (dimethylaminomethyl) phenol, etc.

In the second curable composition, the polysulfide polyether is 5–100 parts by weight, and the amine is 2–30 parts by weight, per 100 parts by weight of the epoxy resin.

The polymer composition of the present invention comprises:

(a) a polysulfide polymer; and
(b) a thiol group-containing polyether having a polyether moiety represented by $-(R_1O)-_n$, wherein $R_1$ is an alkylene group having 2–4 carbon atoms, and n is an integer of 6–200, and a polysulfide bond $S_x$ in a main chain, and a thiol group at ends, a weight ratio of the polysulfide bond to a mercaptan group being 1.06 or more, at a weight ratio (a)/(b)=95/5-5/95.

The polysulfide polymer in the above polymer composition may be those represented by the following formula:

(5)

wherein x is an integer of 1–5, its average value being 2, m is an integer of 1–5, and $R_2$ is an organic residue such as an alkylene group or an alkylene ether group, for instance, $-CH_2CH_2-$, $-C_2H_4OC_2H_4-$, $-C_2H_4OCH_2OC_2H_4-$, $-C_4H_8OC_4H_8-$, etc.

The above polysulfide polymer shows fluidity at room temperature and has a molecular weight of 100–200,000, preferably 400–50,000.

Such polysulfide polymer may be the same as the polysulfide polymer starting material used in the production of the above polysulfide polyether.

The above thiol group-containing polyether may be the same as used in the production of the above polysulfide polyether.

The other preferable thiol group-containing polyethers are mercaptan-terminated liquid polymers represented by the general formula (6) as described in U.S. Pat. No. 3,923,748, in which disulfide bonds are introduced by oxidizing part of the thiol groups with an oxidizing agent, and polymercaptans having the structure represented by the general formula (7) as described in U.S. Pat. No. 4,092,293 and Japanese Patent Publication No. 46-3389, in which disulfide bonds are similarly introduced by oxidizing part of thiol groups with an oxidizing agent.

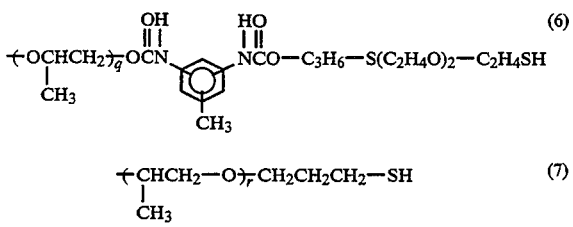

$$\text{—}(\text{CHCH}_2\text{—O})_r\text{CH}_2\text{CH}_2\text{CH}_2\text{—SH} \quad (7)$$
$$\ \ \ \ \ \ \ \ |$$
$$\ \ \ \ \ \ \ \ \text{CH}_3$$

wherein q and r are integers of 6–200.

In the polymer composition of the present invention, a mixing ratio of the polysulfide polymer (a) to the thiol group-containing polyether (b) is 95/5-5/95 by weight ratio. When the mixing ratio is lower than 5/95, the resulting cured product shows poor weathering resistance. On the other hand, when it exceeds 95/5, a sufficient effect of improving compatibility with plasticizers cannot be obtained.

The third curable composition comprises (A) the above polymer composition and (B) an oxidizing agent. By adding an oxidizing agent, curing takes place easily at room temperature, suitable for sealants, adhesives, etc.

The oxidizing agent may be the same as those added to the polysulfide polyether.

The fourth curable composition comprises (A) the above polymer composition, (B) an epoxy resin having two or more epoxy groups in one molecule, and (C) an amine. The fourth curable composition shows an larger low-temperature curing speed than in the case of a polysulfide polymer alone, or a thiol group-containing polyether alone, and the resulting cured product shows improved flexibility and sufficient water-resistant adhesion.

The above epoxy resin and amine may be the same as those added to the above polysulfide polyether.

The fifth curable composition of the present invention comprises:
(A) 100 parts by weight of
  (I) a mixture of:
    (a) a polysulfide polymer, and
    (b) a thiol group-containing polyether having a polyether moiety represented by $\text{—}(R_1O)\text{—}_n$, wherein $R_1$ is an alkylene group having 2–4 carbon atoms, and n is an integer of 6–200, and a polysulfide bond $S_x$ in a main chain, and a thiol group at ends, a weight ratio of the polysulfide bond to a mercaptan group being 1.06 or more, at a weight ratio (a)/(b)=95/5-5/95, and/or
  (II) a polysulfide polyether having in a main chain:
    (i) a polyether moiety represented by $\text{—}(R_1O)\text{—}_n$;
    (ii) structural units represented by
      $\text{—}(C_2H_4O\ CH_2O\ C_2H_4\text{—}S_x)\text{—}$, and
      $\text{—}(CH_2CH\ (OH)\ CH_2\text{—}S_x)\text{—}$,
      wherein x is an integer of 1–5;
    and at both ends
    (iii) a thiol group represented by
      $\text{—}C_2H_4O\ CH_2O\ C_2H_4\text{—}SH$, and/or
      $\text{—}CH_2CH\ (OH)\ CH_2\text{—}SH$;
(B) 1–50 parts by weight of an oxidizing agent;
(C) 0.1–2 parts by weight of sulfur; and
(D) 0.01–10 parts by weight of a vulcanization accelerator and/or an amine.

The form of sulfur is not particularly restricted, but powdery sulfur usable for rubbers is preferable. The amount of sulfur is 0.1–2 parts by weight per 100 parts by weight of the component (A). When the amount of the sulfur is lower than 0.1 parts by weight, sufficient vulcanization effect cannot be obtained. On the other hand, when it exceeds 2 parts by weight, the resulting cured product shows poor properties.

Specific examples of the vulcanization accelerators include thiazoles, thioureas, sulfenamides, thiurams, dithioacids, guanadines, etc. Among them, thiazoles, sulfenamides and thiurams are preferable.

Specific examples of the thiazoles include 2-mercaptobenzothiazole, dibenzothiazyl disulfide, 2-(4-morpholinodithio) benzothiazole, etc.

Specific examples of the sulfenamides include, N-cyclohexyl-2-benzothiazolyl sulfenamide, N-tert-butyl-2-benzothiazolyl sulfenamide, N-oxydiethylene-2-benzothiazolyl sulfenamide, etc.

Specific examples of the thiurams include tetramethylthiuram disulfide, tetrabutylthiuram disulfide, etc.

Specific examples of the amines include aliphatic amines, aliphatic diamines, aliphatic polyamines, alicyclic amines, cyclic amines, etc.

Specific examples of the aliphatic amines include octylamine, laurylamine, etc.

Specific examples of the aliphatic diamines include ethylenediamine, hexamethylenediamine, etc.

Specific examples of the aliphatic polyamines include tetraethylenepentamine, diethylenetriamine, triethylene tetramine, etc.

Specific examples of the alicyclic amines include cyclohexylamine, N-methylcyclohexylamine, etc.

Specific examples of the cyclic amines include N-aminopropyl morpholine, etc.

Apart from the above amines, aromatic amines such as metaphenylenediamine, and ethanol amine, triethylamine, etc. may be used.

The amount of the above vulcanization accelerator and/or amine is 0.01–10 parts by weight, preferably 0.1–4 parts by weight, per 100 parts by weight of the component (A). When the amount of the vulcanization accelerator and/or amine is less than 0.01 parts by weight, sufficient curing acceleration cannot be achieved. On the other hand, when it exceeds 10 parts by weight, an excessively high curing speed is obtained.

The sixth curable composition of the present invention comprises:
(A) 100 parts by weight of
  (I) a mixture of:
    (a) a polysulfide polymer, and
    (b) a thiol group-containing polyether having a polyether moiety represented by $\text{—}(R_1O)\text{—}_n$, wherein $R_1$ is an alkylene group having 2–4 carbon atoms, and n is an integer of 6–200, and polysulfide bonds $S_x$ in a main chain, and a thiol group at ends, a weight ratio of the polysulfide bond to a mercaptan group being 1.06 or more, at a weight ratio (a)/(b)=95/5-5/95, and/or (II) a polysulfide polyether having in a main chain:
(i) a polyether moiety represented by —(R$_1$O)—$_n$;
(ii) structural units represented by
—(C$_2$H$_4$O CH$_2$O C$_2$H$_4$—S$_x$)—, and
—(CH$_2$CH (OH) CH$_2$—S$_x$)—,
wherein x is an integer of 1–5;
and at both ends
(iii) a thiol group represented by
—C$_2$H$_4$O CH$_2$O C$_2$H$_4$—SH, and/or
—CH$_2$CH (OH) CH$_2$—SH;

(B) 1–50 parts by weight of an oxidizing agent; and
(C) 0.5–50 parts by weight of at least one compound selected from the following compounds (i)–(vi):
(i) a compound having a carbon-carbon double bond,
(ii) a nitrogen-containing heterocyclic compound and/or an aromatic amine,
(iii) a phosphonate,
(iv) a thioether antioxidant, and
(v) an epoxy plasticizer.

This sixth curable composition can provide cured product showing good durability with smaller increase of modulus when exposed to a high temperature, suitable for sealants, adhesives, etc.

The above component (A) may be the same composition as the polymer composition and/or the above polysulfide polyether, and the oxidizing agent (B) may be the same as those exemplified as curing agents for polysulfide polyethers. The amount of the oxidizing agent may vary depending upon the type of the oxidizing agent used, but it is generally 1–50 parts by weight per 100 parts by weight of (A) the mixture and/or the polysulfide polyether. When the amount of the oxidizing agent is lower than 1 parts by weight, the curing of the component (A) is insufficient. On the other hand, the amount exceeding 50 parts by weight is economically disadvantageous.

The compound (C) is a material which may be called "modulus adjustor," functioning to prevent the increase in modulus of the cured product when exposed to a high temperature.

Among this modulus adjustor, (i) compounds having a carbon-carbon double bond are selected from unsaturated esters, unsaturated carboxylic acids, unsaturated amines and unsaturated alcohols, and preferably compounds having the structures in which the carbon-carbon double bonds are not conjugated with carbon-oxygen double bonds of esters, carbonyls, carboxyl groups, etc. in the molecules. Such compounds include oleyloleate, octyloleate, methyl 12-acetylricinoleate, trioleyl phosphate, oleic acid monoglyceride, dioleyl adipate, oleic acid, oleyl alcohol, semi-hardened tallow diamines, etc.

In the compound (ii), the nitrogen-containing heterocyclic compound contains at least one nitrogen atom constituting an aromatic ring, and its examples include 2,2,4-trimethyl- 1,2-dihydroquinoline, 6-ethoxy-2,2,4-trimethyl- 1,2-dihydroquinoline, etc. The aromatic amine contains at least one amino group bonded to an aromatic ting, and the amino group preferably has one or more alkyl groups. Such aromatic amines include N-phenyl-N'-isopropyl-p-phenylenediamine, etc.

Specific examples of the phosphonate (iii) include di-2-ethylhexyl 2-ethylhexylphosphonate, mono-2-ethylhexyl 2-ethylhexylphosphonate, etc.

Specific examples of the thioether antioxidant (iv) include pentaerythritol tetra [β-alkyl (C$_{12}$-C$_{18}$) thiopropionate], etc.

Specific examples of the epoxy plasticizers (v) include di-2-ethylhexyl epoxyhexahydrophthalate, diisodecyl epoxyhexahydrophthalate, butyl epoxystearate, epoxized soybean oil, ethyleneglycol diglycidyl ether, propyleneglycol diglycidyl ether, etc.

The above compounds (i)–(v) may be added alone, but if necessary, a mixture of two or more compounds may be added.

The total amount of one or more compounds (i)–(v) is 0.5–50 parts by weight, preferably 1–30 parts by weight, per 100 parts by weight of the polysulfide polymer. When the amount of the compound (C) is lower than 0.5 parts by weight, a sufficient effect of increasing durability while preventing the increase of modulus when exposed to a high temperature of 80° C. or higher cannot be obtained. On the other hand, when it exceeds 50 parts by weight, mixing cost increases.

The first to sixth curable compositions of the present invention may further contain fillers such as calcium carbonate, talc, clay, titanium oxide, silica, etc. for economic reasons and for improving extrudability and properties of the cured products. Further, since the curable compositions of the present invention are compatible with inexpensive phthalate plasticizers such as dioctyl phthalate (DOP), diheptyl phthalate (DHP), etc., which cannot be used in the case of polysulfide polymers alone, these plasticizers can be added. In addition, plasticizers such as chlorinated paraffins, hydrogenated terphenyl, etc. may be added.

Since the curable compositions of the present invention show lower viscosities than the conventional polysulfide polymers, sufficient extrudability can be achieved even when 40 parts by weight or less of plasticizers are added to 100 parts by weight of polymers.

Since the polysulfide polyether of the present invention has a small polarity and is compatible with plasticizers which are not compatible with the conventional polysulfide polymers, thereby showing a small viscosity, the amount of the plasticizer used can be reduced. In addition, when a paint is applied to its cured product, plasticizers are less transferred to a paint coating, thereby preventing the contamination of the paint coating. Further, since the polysulfide polyether contains smaller amounts of low-molecular weight components having molecular weights of 500 or less, its cured product shows improved elongation. When this polysulfide polyether is used with an epoxy resin, it is quickly cured at room temperature to provide a cured product having sufficient adhesion strength and water resistance.

The reasons for obtaining such effects are not necessarily clear, but it may be considered that the polysulfide polyether has a polyether moiety in its main chain.

On the other hand, by mixing a polysulfide polymer with a thiol group-containing polyether having a main chain of —(R$_1$O)—$_n$, and polysulfide bonds S$_x$ and also having thiol groups at ends, a weight ratio of polysulfide bonds to mercaptan groups being 1.06 or more, the polymer shows reduced polarity and viscosity. Accordingly, inexpensive phthalate plasticizers such as dioctyl phthalate (DOP), diheptyl phthalate (DHP), etc., which are not compatible with the polysulfide polymer alone can be used. Further, because of the reduced viscosity, the amount of the plasticizer used can be reduced.

By adding an epoxy resin and an amine to such a mixture, quick curing takes place at room temperature to provide a cured product having sufficient water-resistant adhesion. This is because by mixing two types of polymers: a polysulfide polymer having a good water-resistant adhesion but insufficient curability at room temperature, and a thiol group-containing polyether showing a larger low-temperature curing speed but insufficient water-resistant adhesion, drawbacks of each polymer are overcome, thereby providing a composition having advantages of both polymers.

When such a mixture of polysulfide polymer and a thiol group-containing polyether and/or the polysulfide polyether is mixed with an oxidizing agent, sulfur and a vulcanization accelerator and/or amine, the reduction of a curing speed due to sulfur can be suppressed, and the amount of sulfur can be properly changed to have a curing speed suitable at operating temperature. The reasons for obtaining such effects are not necessarily clear, but it may be considered that the oxidizing agent, sulfur and the vulcanization accelerator and/or amine show desirable interactions.

Further, when the above mixture and/or the polysulfide polyether is blended with an oxidizing agent and a proper amount of at least one of (i) a compound having a carbon-carbon double bond, (ii) a nitrogen-containing heterocyclic compound and/or an aromatic amine, (iii) a phosphonate, (iv) a thioether antioxidant, and (v) an epoxy plasticizer, the resulting cured product shows a smaller increase of modulus when exposed to a high temperature and also drastically improved durability. The reasons for obtaining such effects are not necessarily clear, but it may be considered that the oxidizing agent and the above compounds show synergistic effects.

The present invention will be explained in further detail by way of the following Examples.

SYNTHESIS EXAMPLE 1

1000 g of bifunctional polypropylene glycol (OH value: 162) obtained by adding propylene glycol to propylene oxide, 294.4 g of epichlorohydrin, 2.0 g of stannic chloride ($SnCl_4$) pentahydrate were introduced into a 2-liter-reactor, and stirred at 110° C. for 3 hours. Further, 254.6 g of sodium hydrosulfide (purity: 70%) was added, and a reaction mixture was heated to 100° C. and stirred for 1.5 hours. A salt was then removed to obtain a transparent, pale yellow liquid polymer. The resulting polymer contained 7.0 weight % of sulfur and 5.7 weight % of mercaptan.

SYNTHESIS EXAMPLE 2

1000 g of bifunctional polypropylene glycol (OH value: 112) obtained by adding propylene glycol to propylene oxide, 203.5 g of epichlorohydrin, 2.0 g of stannic chloride pentahydrate were introduced into a 2-liter-reactor, and stirred at 110° C. for 3 hours. Further, 176.0 g of sodium hydrosulfide (purity: 70%) was added, and a reaction mixture was heated to 100° C. and stirred for 1.5 hours. A salt was then removed to obtain a transparent, pale yellow liquid polymer. The resulting polymer contained 5.0 weight % of sulfur and 3.8 weight % of mercaptan.

SYNTHESIS EXAMPLE 3

1000 g of trifunctional polypropylene glycol (OH value: 394) obtained by adding glycerin to propylene oxide, 715.9 g of epichlorohydrin, 2.0 g of stannic chloride pentahydrate were introduced into a 2-liter-reactor, and stirred at 110° C. for 3 hours. Further, 619.1 g of sodium hydrosulfide (purity: 70%) was added, and a reaction mixture was heated to 100° C. and stirred for 1.5 hours. A salt was then removed to obtain a transparent, pale yellow liquid polymer. The resulting polymer contained 12.0 weight % of sulfur and 9.5 weight % of mercaptan.

SYNTHESIS EXAMPLE 4

1000 g of bifunctional polypropylene glycol (OH value: 162) obtained by adding propylene glycol to propylene oxide, 278.3 g of epichlorohydrin, 2.0 g of stannic chloride pentahydrate were introduced into a 2-liter-reactor, and stirred at 100° C. for 3 hours. Further, 240.7 g of sodium hydrosulfide (purity: 70%) was added, and a reaction mixture was heated to 100° C. and stirred for 1.5 hours. A salt was then removed to obtain a transparent, pale yellow liquid polymer. The resulting polymer contained 6.0 weight % of sulfur, and 4.3 weight % of mercaptan. It was confirmed by $^{13}$C-NMR analysis that the resulting polymer contained disulfide bonds.

SYNTHESIS EXAMPLE 5

1000 g of trifunctional polypropylene glycol (OH value: 394) obtained by adding glycerin to propylene oxide, 715.9 g of epichlorohydrin, 2.0 g of stannic chloride pentahydrate were introduced into a 2-liter-reactor, and stirred at 100° C. for 3 hours. Further, 619.1 g of sodium hydrosulfide (purity: 70%) was added, and a reaction mixture was heated to 100° C. and stirred for 1.5 hours. A salt was then removed to obtain a transparent, pale yellow liquid polymer. The resulting polymer contained 12.0 weight % of sulfur and 9.6 weight % of mercaptan. It was confirmed by $^{13}$C-NMR analysis that the resulting polymer contained disulfide bonds.

EXAMPLE 1, COMPARATIVE EXAMPLE 1

The polymer obtained in Synthesis Example 1 and a polysulfide polymer ("THIOKOL LP55," manufactured by Toray Thiokol Co., Ltd.) were mixed at a weight ratio of 1/1 at room temperature, to obtain a transparent, brown polymer composition having a mercaptan content of 3.5 weight % and a viscosity of 60 poise (25° C.).

100 parts by weight of the resulting polymer composition and 16 parts by weight of $PbO_2$ were mixed and cast into a 2-mm-thick mold, and cured at 20° C. for 20 hours to obtain a cured sheet. With respect to this cured sheet, a tensile test was conducted at a tensile speed of 500 mm/min according to ASTM D 638-84TYPE IV. As a result, it showed a breaking strength of 5.7 kg/cm² and an elongation of 500%. Further, it had A hardness of 20 measured according to JIS K 6301.

Apart from the above, this polymer composition was mixed with various plasticizers shown in Table 1 at a weight ratio of 10/5 to measure compatibility. The results are shown in Table 1.

Incidentally, as Comparative Example 1, compatibility was measured on mixtures of polysulfide polymer ("THIOKOL LP55") and various plasticizers at a weight ratio of 10/5. The results are also shown in Table 1.

TABLE 1

| Plasticizer | Example 1 | Comparative Example 1 |
|---|---|---|
| Dibutyl Phthalate (DBP) | Uniform, Transparent | Uniform, Transparent |

TABLE 1-continued

| Plasticizer | Example 1 | Comparative Example 1 |
|---|---|---|
| Butylbenzyl Phthalate (BBP) | Uniform, Transparent | Uniform, Transparent |
| Diheptyl Phthalate (DHP) | Uniform, Transparent | Phase Separation |
| Dioctyl Phthalate (DOP) | Uniform, Transparent | Phase Separation |
| Diisononyl Phthalate (DINP) | Uniform, Transparent | Phase Separation |
| Diisodecyl Phthalate (DIDP) | Uniform, Transparent | Phase Separation |
| Dibutyl Sebacate (DBS) | Slightly Opaque Uniform, Transparent | Phase Separation |
| Dioctyl Adipate (DOA) | Uniform, Transparent | Phase Separation |
| Chlorinated Paraffin[1] | Uniform, Transparent | Uniform, Transparent |
| Xylene Resin[2] | Uniform, Transparent | Uniform, Transparent |
| Triaryl Diethane[3] | Uniform, Transparent | Uniform, Transparent |

Note
[1]Tradename: HC-150, manufactured by Tosoh Corporation.
[2]Tradename: NIKANOL-LLL, manufactured by Mitsubishi Gas Chemical Co., Inc.
[3]Tradename: NISSEKI HISOL SAS-LH, manufactured by Nippon Petrochemicals Co., Ltd.

EXAMPLE 2

The polymer obtained in Synthesis Example 2 and a polysulfide polymer ("THIOKOL LP55" manufactured by Toray Thiokol Co., Ltd.) were mixed at a weight ratio of 7/3 at room temperature, to obtain a transparent, brown polymer composition having a mercaptan content of 2.4 weight % and a viscosity of 120 poise (25° C.).

100 parts by weight of the resulting polymer composition and 11 parts by weight of $PbO_2$ were mixed and cast into a 2-mm-thick mold, and cured at 20° C. for 20 hours to obtain a cured sheet. With respect to this cured sheet, a tensile test was conducted at a tensile speed of 500 mm/min according to ASTM D 638-84TYPE IV. As a result, it showed a breaking strength of 4.0 kg/cm$^2$ and an elongation of 400%. Further, it had A hardness of 14 measured according to JIS K 6301.

EXAMPLE 3, COMPARATIVE EXAMPLE 2

The polymer composition in Example 1 was mixed with a plasticizer and a filler in proportions shown in Table 2 to prepare a resin mixture. And $PbO_2$ (oxidizing agent), a plasticizer and sulfur were mixed in proportions shown in Table 3 to prepare a curing agent.

With respect to a mixture of the resin mixture and the curing agent, an extrusion test was conducted at 5° C. according to JIS A-5758. Also, the mixture was applied to an aluminum plate as a substrate material and cured at 20° C. for 7 days and then at 50° C. for 7 days, to conduct a tensile adhesion test according to JIS A-5758.

As Comparative Example 2, a polysulfide polymer ("THIOKOL LP55") as a polymer component and butylbenzyl phthalate as a plasticizer were used, and their mixture was blended with 7.5 parts by weight of an oxidizing agent ($PbO_2$) to conduct the same test.

Further, a mixture of the resin mixture and the curing agent was cast into a 5-mm-thick mold to produce a cured sheet. After aging at 20° C. for 7 days, this cured sheet was coated with a paint based upon a vinyl chloride resin ("VINYBON," manufactured by Kansai Paint Co., Ltd.), and paints based upon polyacrylate ("VINYDELUXE," manufactured by Kansai Paint Co., Ltd., and "HEKIDINE," manufactured by Daido Toryo Co., Ltd.), respectively, and each of the resulting paint coatings was observed after keeping it at 20° C. for 14 days. With respect to the cured product of Comparative Example 2, the same test was conducted.

The results are shown in Table 4.

TABLE 2

| Composition of Resin Mixture | Parts by Weight |
|---|---|
| Polymer Composition of Example 1 | 100 |
| Plasticizer (Dioctyl Phthalate) | 40 |
| Filler (Calcium Carbonate) | 170 |
| Filler (Titanium Oxide) | 10 |

TABLE 3

| Composition of Curing Agent | Parts by Weight |
|---|---|
| Oxidizing Agent ($PbO_2$) | 13.5 |
| Plasticizer (Dioctyl Phthalate) | 5.0 |
| Sulfur | 0.7 |

TABLE 4

| Properties | Example 3 | Comparative Example 2 |
|---|---|---|
| Extrudability at 5° C. | 9 sec | 50 sec |
| Tensile Adhesion | | |
| 50% Modulus | 2.1 kg/cm$^2$ | 2.8 kg/cm$^2$ |
| 100% Modulus | 3.3 kg/cm$^2$ | 3.0 kg/cm$^2$ |
| Breaking Strength | 5.1 kg/cm$^2$ | 3.6 kg/cm$^2$ |
| Elongation | 560% | 480% |
| Failure Point | Cohesive Failure | Cohesive Failure |
| State of Paint Coating | | |
| Paint A | ○ | x |
| Paint B | ○ | Δ |
| Paint C | ○ | x |

Note:
Paint A: VINYBON
Paint B: VINYDELUXE
Paint C: HEKIDINE
○: Not tacky.
Δ: Slightly tacky.
x: Tacky.

EXAMPLE 4

The polymer obtained in Synthesis Example 3 and a polysulfide polymer ("THIOKOL LP3," manufactured by Toray Thiokol Co., Ltd.) were mixed at a weight ratio of 3/1 at room temperature, to obtain a transparent, brown polymer composition having a mercaptan content of 9.0 weight % and a viscosity of 112 poise (25° C.).

EXAMPLE 5, COMPARATIVE EXAMPLES 3, 4

100 parts by weight of a bisphenol A-type epoxy resin ("EP-4100," manufactured by Asahi Denka Kogyo Kabushiki Kaisha), 80 parts by weight of the polymer composition of Example 4, and 10 parts by weight of 2,4,6-tris (dimethylaminomethyl) phenol were mixed. The resulting mixture was sandwiched between a cold-milled steel plate (1.6 mm × 25 mm × 100 mm), and cured at 20° C. for 14 days in one case, and at 20° C. for 7 days and then in water immersion (20° C.) for 7 days in another case. In both cases, tensile shear adhesion was measured.

In addition, the above components were mixed in a 20-g-scale and measured with respect to a curing speed at 20° C. As a measure of curing, the time at which the mixture lost fluidity was recorded as "gelation time,"

and the time at which the mixture became untacky was recorded as "tack-free time."

On the other hand, in place of the polymer composition of Example 4, only a polysulfide polymer ("THIOKOL LP3,") was used as Comparative Example 3, and only a commercially available thiol group-containing polyether ("CAPCURE 3-800LC," manufactured by Yuka Shell Epoxy Kabushiki Kaisha) was used as Comparative Example 4. In both Comparative Examples, the same mixing ratio was employed as in Example 5, and a tensile shear adhesion and a curing speed were measured.

The results are shown in Table 5.

TABLE 5

| Properties | Example 5 | Comparative Example 3 | Comparative Example 4 |
|---|---|---|---|
| Viscosity at 25° C. (Poise) | 112 | 10 | 122 |
| Curing Speed at 20° C. | | | |
| Gelation Time (minute) | 7 | 70 | 5 |
| Tack-Free Time | 50 minutes | ≧3 hours | 25 minutes |
| Tensile Shear Adhesion (kg/cm$^2$) | | | |
| A$^{(1)}$ | 80.2 | 110.7 | 51.5 |
| B$^{(2)}$ | 83.4 | 110.4 | 35.3 |

Note
$^{(1)}$After 14 days at 20° C.
$^{(2)}$After 7 days at 20° C. + 7 days in water immersion.

EXAMPLES 6-14

The polymer obtained in Synthesis Example 1 and a polysulfide polymer ("THIOKOL LP55") were mixed at a weight ratio of 1/1 at room temperature, to obtain a transparent, brown polymer composition having a mercaptan content of 3.5 weight % and a viscosity of 60 poise (25° C.).

The resulting polymer composition was mixed with a plasticizer and a filler in proportions shown in Table 6 to obtain a resin mixture, and a curing agent was produced by mixing lead peroxide, a plasticizer, sulfur and a filler in proportions shown in Table 7. Further, various colorants were obtained by mixing carbon black, various vulcanization accelerators or amines shown in Table 9, a plasticizer and a filler in proportions shown in Table 8.

The resin mixture, the curing agent and each colorant thus obtained were separately stored at 20° C. for 24 hours, and mixed together at a constant temperature of 20° C. Each of the resulting mixtures was poured into an aluminum cup of 35 mm in height and 30 mm in inner diameter, and stored at 20° C.

With respect to each of the resulting mixtures, penetration after 24 hours was measured by using a penetrometer according to JIS K-2207. When penetration was 30 or less, the mixture was regarded as "cured," and when it exceeded 30, the mixture was regarded as "uncured."

The results are shown Table 9 together with the vulcanization accelerators or amines used.

Further, the same mixture as in Example 6 except for containing no vulcanization accelerator or amine (Example 14) was similarly subjected to a penetration test. The results are shown in Table 9.

TABLE 6

| Composition of Resin Mixture | Parts by Weight |
|---|---|
| Polymer Composition | 100 |
| Plasticizer (Diheptyl Phthalate) | 30 |
| Filler (Calcium Carbonate) | 160 |
| Filler (Titanium Oxide) | 10 |

TABLE 7

| Composition of Curing Agent | Parts by Weight |
|---|---|
| Oxidizing Agent (PbO$_2$) | 13.0 |
| Plasticizer (Chlorinated Paraffin) | 7.4 |
| Sulfur | 0.6 |
| Filler (Calcium Carbonate) | 6.0 |

TABLE 8

| Composition of Colorant | Parts by Weight |
|---|---|
| Carbon Black | 0.3 |
| Plasticizer (Diheptyl Phthalate) | 6.0 |
| Filler (Calcium Carbonate) | 2.0 |
| Filler (Titanium Oxide) | 6.7 |
| Vulcanization Accelerator or Amine | 2.0 |

TABLE 9

| Example No. | Vulcanization Accelerator or Amine | State of Mixture |
|---|---|---|
| 6 | Tetramethylthiuram Disulfide | Cured |
| 7 | Tetrabutylthiuram Disulfide | Cured |
| 8 | N-cyclohexyl-2-benzothiazolyl Sulfenamide | Cured |
| 9 | N-oxydiethylene-2-benzothiazolyl Sulfenamide | Cured |
| 10 | Laurylamine | Cured |
| 11 | Cyclohexylamine | Cured |
| 12 | Tetraethylene Pentamine | Cured |
| 13 | N-aminopropylmorpholine | Cured |
| 14 | — | Not Cured |

As is clear from Table 9, the curable composition obtained from the polymer composition of the present invention, an oxidizing agent, sulfur and a vulcanization accelerator or an amine was cured at 20° C. after 24 hours. On the other hand, the composition containing no vulcanization accelerator or amine in Example 14 was kept uncured.

EXAMPLES 15-19

The resin mixture shown in Table 6, the curing agent shown in Table 7, and the colorant shown Table 8 except for using a vulcanization accelerator and/or an amine shown in Table 10 were separately stored at 5° C. for 24 hours, and then mixed together at a constant temperature of 5° C. Each of the resulting mixtures was poured into an aluminum cup of 35 mm in height and 30 mm in inner diameter, and stored at 5° C.

With respect to each of them, penetration after 24 hours was measured by using a penetrometer according to JIS K-2207 in the same manner as in Example 6.

The results are shown in Table 10.

TABLE 10

| Example No. | Tetramethyl Thiuram Disulfide (Parts by Weight) | Lauryl Amine (Parts by Weight) | State of Mixture |
|---|---|---|---|
| 15 | 2.0 | — | Not Cured |
| 16 | 4.0 | — | Cured |
| 17 | 1.5 | 0.8 | Not Cured |
| 18 | 2.0 | 0.8 | Cured |

TABLE 10-continued

| Example No. | Tetramethyl Thiuram Disulfide (Parts by Weight) | Lauryl Amine (Parts by Weight) | State of Mixture |
|---|---|---|---|
| 19 | — | — | Not Cured |

It is clear from Table 10 that the curable composition of the present invention shows a curing speed which can be changed even at the same temperature by changing the amount of a vulcanization accelerator and/or an amine.

EXAMPLES 20-34

The polymer obtained in Synthesis Example 1 and a polysulfide polymer ("THIOKOL LP55") were mixed at a weight ratio of 1/1 at room temperature, to obtain a transparent, brown polymer composition having a mercaptan content of 3.5 weight % and a viscosity of 60 poise (25° C.).

The resulting polymer composition was mixed with a plasticizer and a filler in proportions shown in Table 11 to obtain a resin mixture A. Further, lead peroxide, a plasticizer, sulfur and a filler were mixed in proportions shown in Table 12 to obtain a curing agent A. The resin mixture A and the curing agent A were mixed together with 2-7 parts by weight of various compounds (modulus adjustors) shown in Table 13, and each of the resulting mixtures was applied to an aluminum plate as a substrate material to conduct a tensile adhesion test according to JIS A-5758. The curing conditions were 50° C. for 7 days, and the same test was conducted under the conditions of 50° C. for 7 days + 90° C. for 14 days.

On the other hand, as Example 34, the resin mixture A and the curing agent A were mixed without adding the modulus adjustor, and the same test was conducted. The results are shown in Table 14.

TABLE 11

| Composition of Resin Mixture A | Parts by Weight |
|---|---|
| Polymer Composition | 100 |
| Plasticizer (Diheptyl Phthalate) | 30 |
| Filler (Calcium Carbonate) | 170 |
| Filler (Titanium Oxide) | 10 |

TABLE 12

| Composition of Curing Agent A | Parts by Weight |
|---|---|
| Oxidizing Agent (PbO$_2$) | 11.5 |
| Plasticizer (Chlorinated Paraffin) | 8.4 |
| Filler (Calcium Carbonate) | 10.5 |
| Sulfur | 0.6 |

TABLE 13

| Example No. | Modulus Adjustor | Amount (Parts by Weight) |
|---|---|---|
| 20 | Oleyloleate | 7 |
| 21 | Octyloleate | 7 |
| 22 | Methyl 12-Acetylricinoleate | 7 |
| 23 | Trioleyl Phosphate | 7 |
| 24 | Oleic Acid Monoglyceride | 7 |
| 25 | Dioleyl Adipate | 7 |
| 26 | Oleic Acid | 7 |
| 27 | 2,2,4-Trimethyl-1,2-Dihydroquinoline | 2 |
| 28 | 6-Ethoxy-2,2,4-Trimethyl-1,2-Dihydroquinoline | 2 |
| 29 | N-Phenyl-N'-Isopropyl-p-Phenylene diamine | 2 |

TABLE 13-continued

| Example No. | Modulus Adjustor | Amount (Parts by Weight) |
|---|---|---|
| 30 | Di-2-Ethylhexyl 2-Ethylhexyl phosphonate | 4 |
| 31 | Mono-2-Ethylhexyl 2-Ethylhexyl phosphonate | 4 |
| 32 | Pentaerythritol Tetra [β-Alkyl ($C_{12}$–$C_{18}$) Propionate] | 2 |
| 33 | { 2,2,4-Trimethyl-1,2-Dihydroquinoline<br>Pentaerythritol Tetra [β-Alkyl ($C_{12}$–$C_{18}$) Propionate] | 2<br>1 |

TABLE 14

Tensile Adhesion Test Results

| | After Aging at 50° C. for 7 Days | | After Aging at 50° C. for 7 Days + at 90° C. for 14 Days | |
|---|---|---|---|---|
| Example No. | 50% Modulus (kg/cm$^2$) | Elongation at Break (%) | 50% Modulus (kg/cm$^2$) | Elongation at Break (%) |
| 20 | 1.1 | 680 | 3.3 | 370 |
| 21 | 1.5 | 660 | 3.8 | 280 |
| 22 | 1.4 | 480 | 3.7 | 250 |
| 23 | 2.2 | 350 | 3.5 | 280 |
| 24 | 0.8 | 660 | 1.8 | 400 |
| 25 | 0.8 | 720 | 2.2 | 310 |
| 26 | 0.6 | 660 | 1.9 | 370 |
| 27 | 1.1 | 410 | 1.6 | 360 |
| 28 | 1.3 | 480 | 2.0 | 350 |
| 29 | 1.0 | 300 | 1.7 | 300 |
| 30 | 1.9 | 300 | 4.3 | 130 |
| 31 | 1.9 | 290 | 4.8 | 150 |
| 32 | 1.0 | 560 | 1.9 | 140 |
| 33 | 1.6 | 560 | 2.3 | 340 |
| 34 | 2.3 | 220 | 5.0 | 130 |

It is clear from Table 14 that the curable composition of the present invention containing an oxidizing agent and a modulus adjustor suffers from less increase of modulus when exposed to a high temperature than those containing no modulus adjustor.

EXAMPLE 35

300 g of the polymer obtained in Synthesis Example 4 and 300 g of a polysulfide polymer ("THIOKOL LP55") were introduced into a 1-liter-reactor, and stirred while heating at 90° C. for 4 hours to obtain a transparent, brown polymer having a mercaptan content of 3.2 weight % and a viscosity of 60 poise (25° C.). As a result of gel permeation chromatography analysis, it was found that this polymer contained 6.5 weight % of a low-molecular weight component having a number-average molecular weight of 500 or less.

EXAMPLE 36

1000 g of bifunctional polypropylene glycol (OH value: 162) obtained by adding propylene glycol to propylene oxide, 278.3 g of epichlorohydrin, 2.0 g of stannic chloride pentahydrate were introduced into a 2-liter-reactor, and stirred at 100° C. for 3 hours. Further, 240.7 g of sodium hydrosulfide (purity: 70%) and 1278 g of a polysulfide polymer ("THIOKOL LP55") were added, and a reaction mixture was stirred at 100° C. for 4 hours. A salt was then removed to obtain a transparent, pale yellow liquid polymer. As a result of gel permeation chromatography analysis, it was found that this polymer contained 7.5 weight % of a low-molecular weight component having a number-average molecular weight of 500 or less.

EXAMPLE 37

The polymer obtained in Synthesis Example 4 and a polysulfide polymer ("THIOKOL LP55") were mixed at a weight ratio of 1/1 at room temperature. As a result of gel permeation chromatography analysis conducted in the same manner as in Example 35, it was found that this polymer contained 35 weight of a low-molecular weight component having a number-average molecular weight of 500 or less.

20 g of each polymer obtained in Examples 35–37 and 3.5 g of a curing agent having a formulation shown in Table 15 were mixed and cast into a 2-mm-thick mold, and cured at 20° C. for 20 hours to obtain a cured sheet. With respect to this cured sheet, a tensile test was conducted at a tensile speed of 500 mm/min according to ASTM D 638-84TYPE IV to measure 100% modulus, breaking strength and elongation. Further, A hardness was measured according to JIS K 6301.

The results are shown in Table 16.

TABLE 15

| Composition of Curing Agent | Parts by Weight |
| --- | --- |
| Oxidizing Agent (PbO$_2$) | 7.5 |
| Plasticizer (Chlorinated Paraffin) | 2.5 |

TABLE 16

| Example No. | 100%-Modulus (kg/cm$^2$) | Breaking Strength (kg/cm$^2$) | Elongation (%) | A Hardness |
| --- | --- | --- | --- | --- |
| 40 | 1.5 | 4.0 | 550 | 10 |
| 41 | 1.9 | 5.3 | 600 | 15 |
| 42 | 3.2 | 4.9 | 220 | 18 |

It is clear from Table 16 that the cured products of Examples 35–37 show good 100%-modulus and breaking strength. Particularly, the polysulfide polyethers of Examples 35 and 36 show smaller 100%-modulus and larger elongation than the mixture of the same components (Example 37).

EXAMPLE 38

The polymer obtained in Example 35 was mixed with various plasticizers shown in Table 17 at a weight ratio of 10/5 (polymer/plasticizer) to investigate compatibility. The results are shown in Table 17.

EXAMPLE 39

The polymer obtained in Example 36 was mixed with various plasticizers shown in Table 17 at a weight ratio of 10/5 (polymer/plasticizer) to investigate compatibility. The results are also shown in Table 17.

COMPARATIVE EXAMPLE 5

A polysulfide polymer ("THIOKOL LP55") was mixed with various plasticizers shown in Table 17 at a weight ratio of 10/5 (polymer/plasticizer) to investigate compatibility. The results are also shown in Table 17.

TABLE 17

| Plasticizer | Example 38 | Example 39 | Comparative Example 5 |
| --- | --- | --- | --- |
| Dibutyl Phthalate (DBP) | Uniform, Transparent | Uniform, Transparent | Uniform, Transparent |
| Butylbenzyl Phthalate (BBP) | Uniform, Transparent | Uniform, Transparent | Uniform, Transparent |
| Diheptyl Phthalate (DHP) | Uniform, Transparent | Uniform, Transparent | Phase Separation |
| Dioctyl Phthalate (DOP) | Uniform, Transparent | Uniform, Transparent | Phase Separation |
| Diisononyl Phthalate (DINP) | Uniform, Transparent | Uniform, Transparent | Phase Separation |
| Diisodecyl Phthalate (DIDP) | Uniform, Slightly Opaque | Uniform, Slightly Opaque | Phase Separation |
| Dibutyl Sebacate (DBS) | Uniform, Transparent | Uniform, Transparent | Phase Separation |
| Dioctyl Adipate (DOA) | Uniform, Transparent | Uniform, Transparent | Phase Separation |
| Chlorinated Paraffin[1] | Uniform, Transparent | Uniform, Transparent | Uniform, Transparent |
| Xylene Resin[2] | Uniform, Transparent | Uniform, Transparent | Uniform, Transparent |

Note
[1]Tradename: HC-150, manufactured by Tosoh Corporation.
[2]Tradename: NIKANOL-LLL, manufactured by Mitsubishi Gas Chemical Co., Inc.

EXAMPLE 40

The polymer obtained in Example 35 was mixed with a plasticizer and fillers in proportions shown in Table 18 to prepare a resin mixture. Also, PbO$_2$ (oxidizing agent), a plasticizer, and sulfur were mixed in proportions shown in Table 19 to prepare a curing agent.

The resin mixture and the curing agent was mixed and cast into a 5-mm-thick mold to produce a cured sheet. After curing at 20° C. for 7 days, this cured sheet was coated with a paint based upon a vinyl chloride resin ("VINYBON") and paints based upon polyacrylate ("VINYDELUXE" and "HEKIDINE"), respectively, and a state of each paint coating was observed after keeping it at 20° C. for 14 days.

The results are shown in Table 20.

EXAMPLE 41

A cured sheet was produced from the polymer obtained in Example 36, and each paint was applied thereto in the same manner as in Example 40 to observe the state of the resulting paint coating.

The results are also shown in Table 20.

COMPARATIVE EXAMPLE 6

A polysulfide polymer ("THIOKOL LP55") as a polymer component, and butylbenzyl phthalate as a plasticizer were used to produce a resin agent, and 7.5 parts by weight of an oxidizing agent was used as a curing agent. The resin mixture and the curing agent were mixed and cast into a 5-mm-thick mold to produce a cured sheet, and a paint was applied thereto in the same manner as in Example 40 to observe the state of the resulting coating.

The results are shown in Table 20.

TABLE 18

| Composition of Resin Mixture | Parts by Weight |
| --- | --- |
| Polymer | 100 |
| Plasticizer (Dioctyl Phthalate) | 40 |
| Filler (Calcium Carbonate) | 170 |
| Filler (Titanium Oxide) | 10 |

TABLE 19

| Composition of Curing Agent | Parts by Weight |
| --- | --- |
| Oxidizing Agent (PbO$_2$) | 13.5 |
| Plasticizer (Dioctyl Phthalate) | 5.0 |

TABLE 19-continued

| Composition of Curing Agent | Parts by Weight |
|---|---|
| Sulfur | 0.7 |

TABLE 20

| Paint | Example 40 | Example 41 | Comparative Example 6 |
|---|---|---|---|
| VINYBON | ○ | ○ | x |
| VINYDELUXE | ○ | ○ | △ |
| HEKIDINE | ○ | ○ | x |

Note:
○: Not tacky.
△: Slightly tacky.
x: Tacky.

EXAMPLE 42

600 g of the polymer obtained in Synthesis Example 5 and 200 g of a polysulfide polymer ("THIOKOL LP3") were introduced into a 1-liter-reactor, and stirred while heating at 90° C. for 4 hours to obtain a transparent, brown polymer having a mercaptan content of 8.4 weight % and a viscosity of 128 poise (25° C.). As a result of gel permeation chromatography analysis, it was found that this polymer contained 9.6 weight % of a low-molecular weight component having a number-average molecular weight of 500 or less.

80 g of the resulting polymer, 100 g of a bisphenol A-type epoxy resin ("EP-4100," manufactured by Asahi Denka Kogyo Kabushiki Kaisha), and 10 g of 2,4,6-tris (dimethylaminomethyl) phenol were mixed. The resulting mixture was sandwiched between cold-mill steel plates of 1.6 mm×25 mm×100 mm, and cured at 20° C. for 14 days in one case and at 20° C. for 7 days and then at 20° C. in water immersion for 7 days in another case. With respect to each of the resulting cured sheets, a tensile shear adhesion was measured.

In addition, the above components were mixed in a 20-g-scale and measured with respect to a curing speed at 20° C. As a measure of curing, the time at which the mixture lost fluidity was recorded as "gelation time," and the time at which the mixture became untacky was recorded as "tack-free time."

The results are shown in Table 21. For comparison, the data of Comparative Examples 3 and 4 are also shown in Table 21.

TABLE 21

| Properties | Example 42 | Comparative Example 3 | Comparative Example 4 |
|---|---|---|---|
| Curing Speed at 25° C. | | | |
| Gelation Time (minute) | 7 | 70 | 5 |
| Tack-Free Time | 50 minutes | ≥3 hours | 25 minutes |
| Tensile Shear Adhesion (kg/cm²) | | | |
| A⁽¹⁾ | 94.9 | 110.7 | 51.5 |
| B⁽²⁾ | 88.7 | 110.4 | 35.3 |

Note
$^{(1)}$After 14 days at 20° C.
$^{(2)}$After 7 days at 20° C. + 7 days in water immersion at 20° C.

EXAMPLE 43–46

100 parts by weight of the polymer obtained in Example 35 was mixed with a plasticizer and fillers in proportions shown in Table 6 to obtain a resin mixture, and a curing agent was produced by mixing lead peroxide, a plasticizer, sulfur and a filler in proportions shown in Table 7. Further, a colorant was obtained by mixing carbon black, a plasticizer, fillers and a vulcanization accelerator or an amine, in proportions shown in Table 8.

The resin mixture, the curing agent and the colorant thus obtained were stored separately at 20° C. for 24 hours, and mixed at a constant temperature of 20° C. Each of the resulting mixtures was poured into an aluminum cup of 35 mm in height and 30 mm in inner diameter, and stored at 20° C.

With respect to each mixture, penetration after 24 hours was measured by using a penetrometer according to JIS K-2207. The results are shown Table 22 together with vulcanization accelerators or amines used.

Further, the same mixture as in Example 43 except for containing no vulcanization accelerator or amine (Example 46) was produced, and penetration was also measured. The results are also shown in Table 22.

TABLE 22

| Example No. | Vulcanization Accelerator or Amine | State of Composition |
|---|---|---|
| 43 | Tetramethylthiuram Disulfide | Cured |
| 44 | Laurylamine | Cured |
| 45 | N-aminopropylmorpholine | Cured |
| 46 | — | Not Cured |

EXAMPLES 47–51

The polymer obtained in Example 35 was mixed with a plasticizer, fillers and a modulus adjustor in proportions shown in Table 23 to prepare a resin mixture. Also, PbO₂, a plasticizer, sulfur and a filler were mixed in proportions shown in Table 24 to prepare a curing agent. Incidentally, the modulus adjustors are shown in Table 25, and 10 parts by weight of the modulus adjustor in Example 47 means 2 parts by weight of the modulus adjustor + 8 parts by weight of the plasticizer.

A mixture of the resin mixture and the curing agent was applied to an aluminum plate and cured at 50° C. for 7 days, to conduct a tensile adhesion test according to JIS A-5758. The same test was conducted on those cured at 50° C. for 7 days and further at 90° C. for 14 days.

On the other hand, as Example 51, 10 parts by weight of a plasticizer (dioctyl phthalate) was used in place of the modulus adjustor, and same test was conducted.

The results are shown in Table 26.

TABLE 23

| Composition of Resin Mixture | Parts by Weight |
|---|---|
| Polymer of Example 35 | 100 |
| Plasticizer (Dioctyl Phthalate) | 20 |
| Filler (Calcium Carbonate) | 170 |
| Filler (Titanium Oxide) | 10 |
| Modulus Adjustor | 10 |

TABLE 24

| Composition of Curing Agent | Parts by Weight |
|---|---|
| Oxidizing Agent (PbO₂) | 12.0 |
| Plasticizer (Chlorinated Paraffin) | 7.4 |
| Filler (Calcium Carbonate) | 3.9 |
| Sulfur | 0.7 |

TABLE 25

| Example No. | Modulus Adjuster | Amount (Parts by Weight) |
| --- | --- | --- |
| 47 | Pentaerythritol Tetra [β-Alkyl (C$_{12}$–C$_{18}$) Propionate] | 10* |
| 48 | Di-2-ethylhexyl Epoxyhexahydro phthalate | 10 |
| 49 | Oleyl Alcohol | 10 |
| 50 | Oleic Acid | 10 |
| 51 | — | — |

Note*: 2 parts by weight of modulus adjustor + 8 parts by weight of plasticizer.

TABLE 26

| | Tensile Adhesion Test Results | | | |
| --- | --- | --- | --- | --- |
| | After Aging at 50° C. for 7 Days | | After Aging at 50° C. for 7 Days + at 90° C. for 14 Days | |
| Example No. | 50% Modulus (kg/cm$^2$) | Elongation at Break (%) | 50% Modulus (kg/cm$^2$) | Elongation at Break (%) |
| 47 | 1.4 | 590 | 2.1 | 410 |
| 48 | 1.4 | 510 | 2.4 | 360 |
| 49 | 0.9 | 610 | 1.3 | 520 |
| 50 | 0.7 | 810 | 1.2 | 720 |
| 51 | 1.3 | 570 | 2.7 | 360 |

It is clear from Table 26 that the curable composition of the present invention comprising the polysulfide polyether and the modulus adjustor suffers from smaller increase in modulus when exposed to a high temperature than those containing no modulus adjustor.

Since the polysulfide polyether of the present invention is compatible with inexpensive phthalate plasticizers such as dioctyl phthalate (DOP), diheptyl phthalate (DHP), etc., which are not compatible with the polysulfide polymers, and shows a smaller viscosity, the amount of the plasticizer used can be reduced. In addition, when a paint is applied to its cured product, plasticizers are less transferred to a paint coating, thereby preventing the softening of the paint coating. Further, since the polysulfide polyether contains a smaller amount of a low-molecular weight component, its cured product shows improved elongation. When this polysulfide polyether is used with epoxy resin and amines, it is quickly cured at a low temperature to provide cured products having sufficient water-resistant adhesion.

Further, by adding an oxidizing agent, sulfur and a vulcanization accelerator and/or an amine, the curing speed suitable at operating temperature can be obtained.

When the above mixture is blended with a modulus adjustor, the resulting cured product shows a smaller increase in modulus when exposed to a high temperature of 80° C. or higher and also drastically improved durability.

Such curable compositions are suitable for sealants, potting materials, adhesives, etc.

What is claimed is:

1. A polysulfide polyether having in a main chain:
   (i) a polyether moiety represented by —(R$_1$O)—$_n$, wherein R$_1$ is an alkylene group having 2-4 carbon atoms, and n is an integer of 6-200;
   (ii) structural units represented by
   —(C$_2$H$_4$O CH$_2$O C$_2$H$_4$—S$_x$)—, and
   —(CH$_2$CH (OH) CH$_2$—S$_x$)—,
   wherein x is an integer of 1-5;
   and at both ends
   (iii) a thiol group represented by
   —C$_2$H$_4$O CH$_2$O C$_2$H$_4$—SH, and/or
   —CH$_2$CH OF CH$_2$—SH.

2. The polysulfide polyether according to claim 1 which contains 2-95 weight % of the —(R$_1$O)—$_m$ polyether moiety, 3-70 weight of the —(C$_2$H$_4$OCH$_2$OC$_2$H$_4$—S$_x$)— structural unit and 1-50 weight % of the —(CH$_2$CH(OH)CH$_2$—S$_x$)— structural unit.

3. The polysulfide polyether according to claim 1 or 2, which it has a number-average molecular weight of 600-200,000.

4. The polysulfide polyether according to claim 1, wherein said polysulfide bond S$_x$ is a disulfide bond.

* * * * *